UNITED STATES PATENT OFFICE.

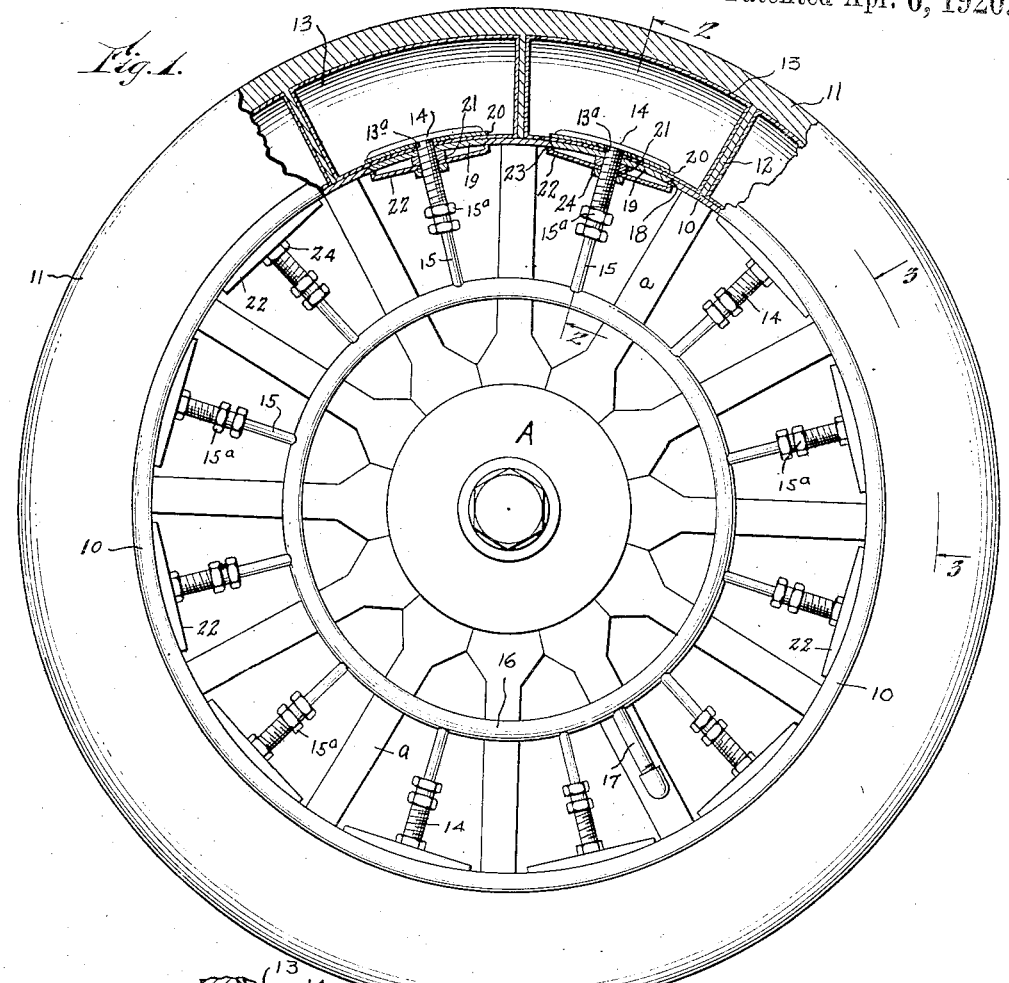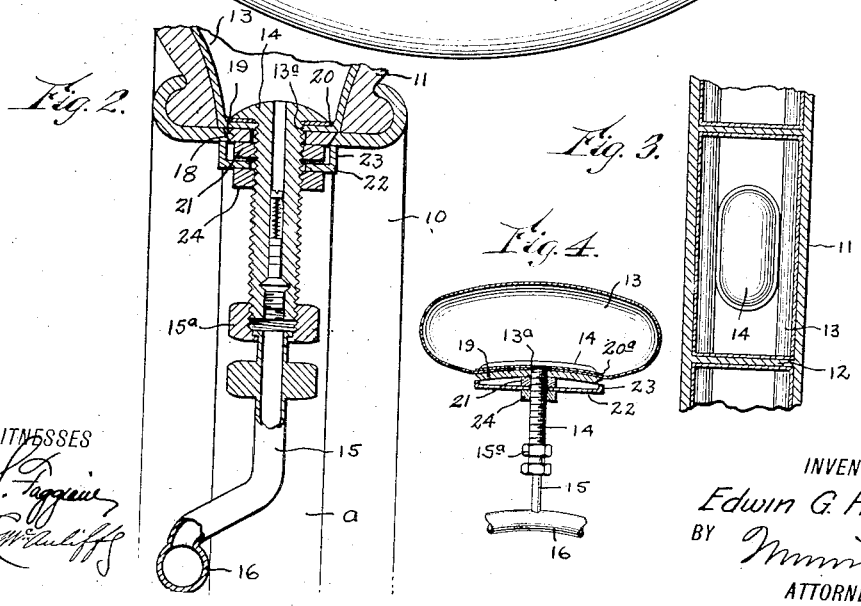

EDWIN GEORGE FIDO, OF BOMBAY, INDIA.

PNEUMATIC TIRE.

1,336,348.  Specification of Letters Patent.  Patented Apr. 6, 1920.

Application filed March 11, 1919. Serial No. 281,936.

*To all whom it may concern:*

Be it known that I, EDWIN G. FIDO, a subject of the King of England, and a resident of Bombay, India, have invented a new and Improved Pneumatic Tire, of which the following is a full, clear, and exact description.

My invention relates to the type of tires in which the casing is formed with separate segmental chambers, each having its individual inner tube and tire valve.

The invention has for an object to provide a tire of the type indicated and improved in various parts with a view to facilitate the insertion and removal of the individual inner tubes and to provide a novel means associated with the individual valves to close rim openings of ample size through which the inner tubes and valves are inserted, the closure means being of a character to effectively maintain the valves and the parts appurtenant thereto in position whether the inner tubes be inflated or deflated.

The said object and others as will appear are attained by the novel construction and combination of parts hereinafter described.

Reference is to be had to the accompanying drawings forming part of this specification, it being understood that the drawings are merely illustrative of one example of the invention.

Figure 1 is a partly sectional side view of a wheel equipped with my tire and its appurtenances.

Fig. 2 is an enlarged cross section on line 2—2, Fig. 1.

Fig. 3 is a transverse section taken longitudinally of the tire, as indicated by the line 3—3, Fig. 1.

Fig. 4 is a partly sectional side view of an inner tube, tire valve, and the connection thereof with the distributing tube.

In carrying out my invention, any approved wheel A, here shown as having spokes $a$, is provided with a fixed rim 10. The tire casing 11, secured to the rim 10 in any approved manner, is provided with radial partitions 12 dividing the tire into segmental chambers. In each chamber a separate inner tube 13 is provided, adapted when inflated to completely fill the chamber. An individual tire valve 14 is associated with each inner tube 13, said valve being detachably connected with radial branches 15 leading from the annular air-distributing tube 16 having a tire valve 17. The connection between the tire valves 14 and the branches 15 may be through the medium of any approved coupling $15^a$.

The stem of the tire valve extends through an opening $13^a$ in the inner tube 13, and an opening 18 is provided in the rim 10 of ample size to facilitate the entrance of the inner tube and its attached tire valve. The opening 18 flares outwardly, and to close the same a cover plate 19 is provided having its edges beveled to correspond with the flare of the opening 18. Therefore, when the plate 19 is positioned in the opening 18 the bevel edge thereof and the co-acting flare presented by the opening will prevent the said plate from displacement inwardly, the inflated tire serving to seat the plate firmly in the opening. The cover plate 19 is utilized to clamp the inner tube between said plate and the head of the tire valve 14, a washer 20 being employed if desired on the valve stem between the inner tube and the head of the valve, clamping pressure being applied to the plate 19 by a nut 21 threaded on to the valve stem and bearing against said plate. In order to prevent the cover plate 19 from moving radially outward, that is to say, into the chamber of the tire casing 11 when the inner tube 13 therein is deflated, I provide a washer 22 on the valve stem radially inward from the cover plate 19 and having an edge flange 23 adapted to bear against the rim 10 at the inner face thereof, said washer being larger than the opening 18 in said rim. A nut 24 on the stem serves to press the washer 22 against the rim to firmly hold the parts in position, and the loosening of the nuts 24 and 21 will be all that is necessary to detach the valve in renewing the inner tube.

In conclusion, I would state that while the illustrated example constitutes a practical embodiment of my invention, I do not limit myself strictly to the mechanical details herein illustrated, since, manifestly, the same can be considerably varied without departure from the spirit of the invention as defined in the appended claim.

I claim:

The combination with a vehicle wheel having a rim thereon, of a tire casing divided into separate chambers, said rim having openings therethrough to said chambers, said openings flaring outwardly, a cover plate forming a closure for each of said openings and presenting bevel edges corresponding with the flare of the openings, separate inner tubes for the chambers of the casing, a tire valve for each inner tube and each extending through the cover plate, said valves having heads and the respective inner tubes being clamped between said heads and the cover plates, a nut on each valve stem adjacent to the cover plate to force said plate into clamping position, a second nut on said stem, and a flanged washer on the stem between said nuts and extending laterally beyond the cover plate a distance to engage the inner side of the said rim so that tightening of the second nut will draw said cover plate into wedging engagement in the rim opening provided therefor and prevent movement of the cover plate into the adjacent tire chamber when the inner tube of said chamber is deflated.

EDWIN GEORGE FIDO.